April 20, 1948.     B. PRATT     2,440,020
DISK BRAKE
Filed June 26, 1945     3 Sheets-Sheet 1
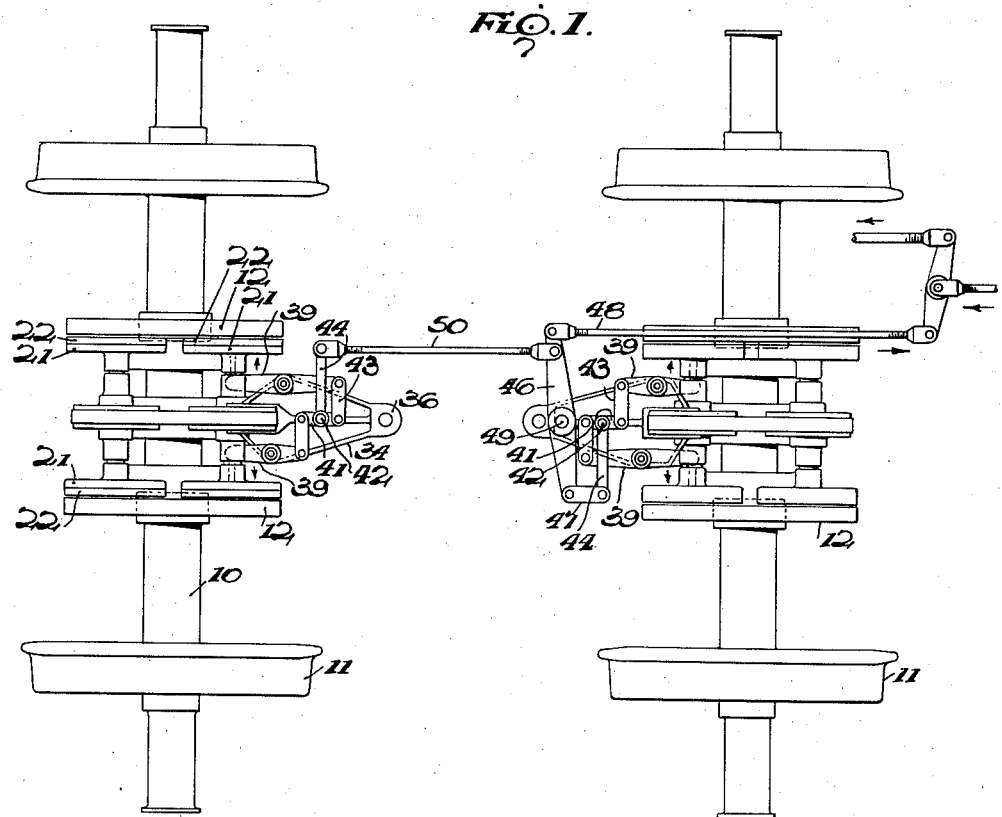
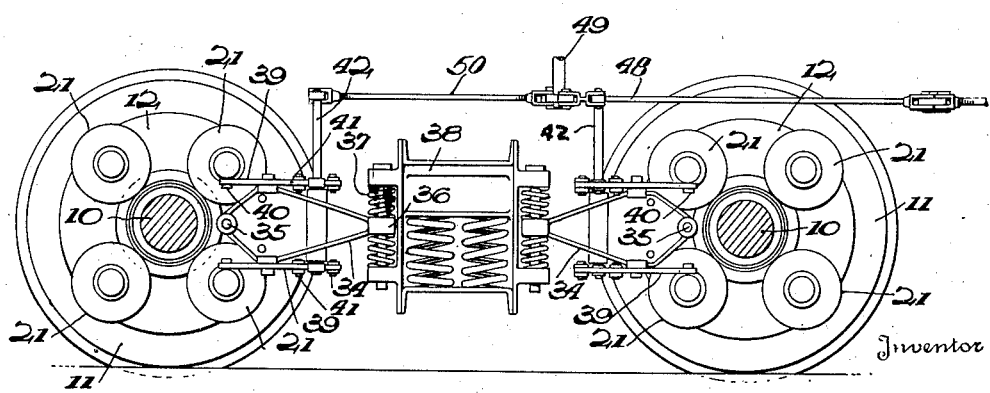
Inventor
Best Pratt.

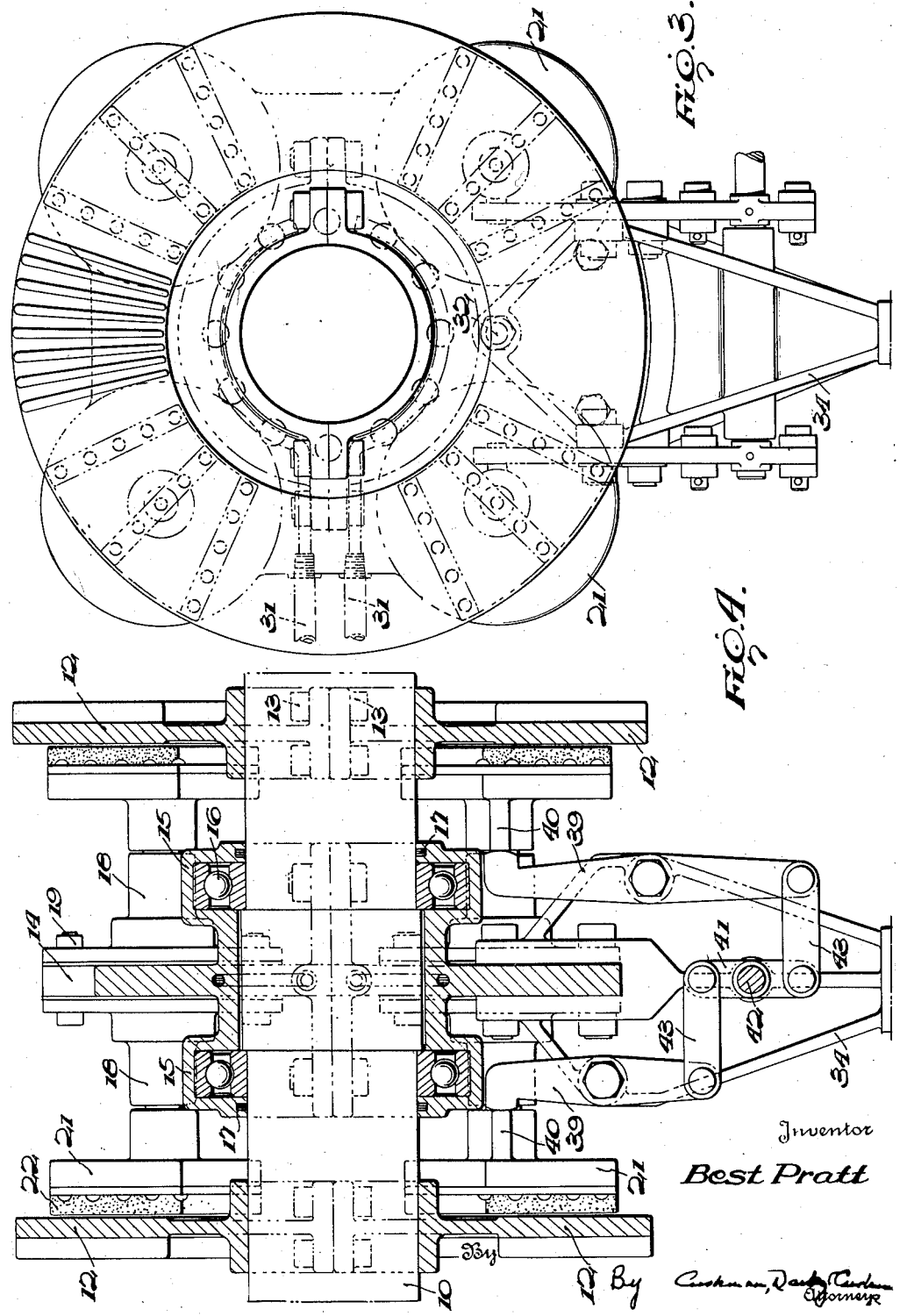

April 20, 1948.    B. PRATT    2,440,020
DISK BRAKE
Filed June 26, 1945    3 Sheets-Sheet 3
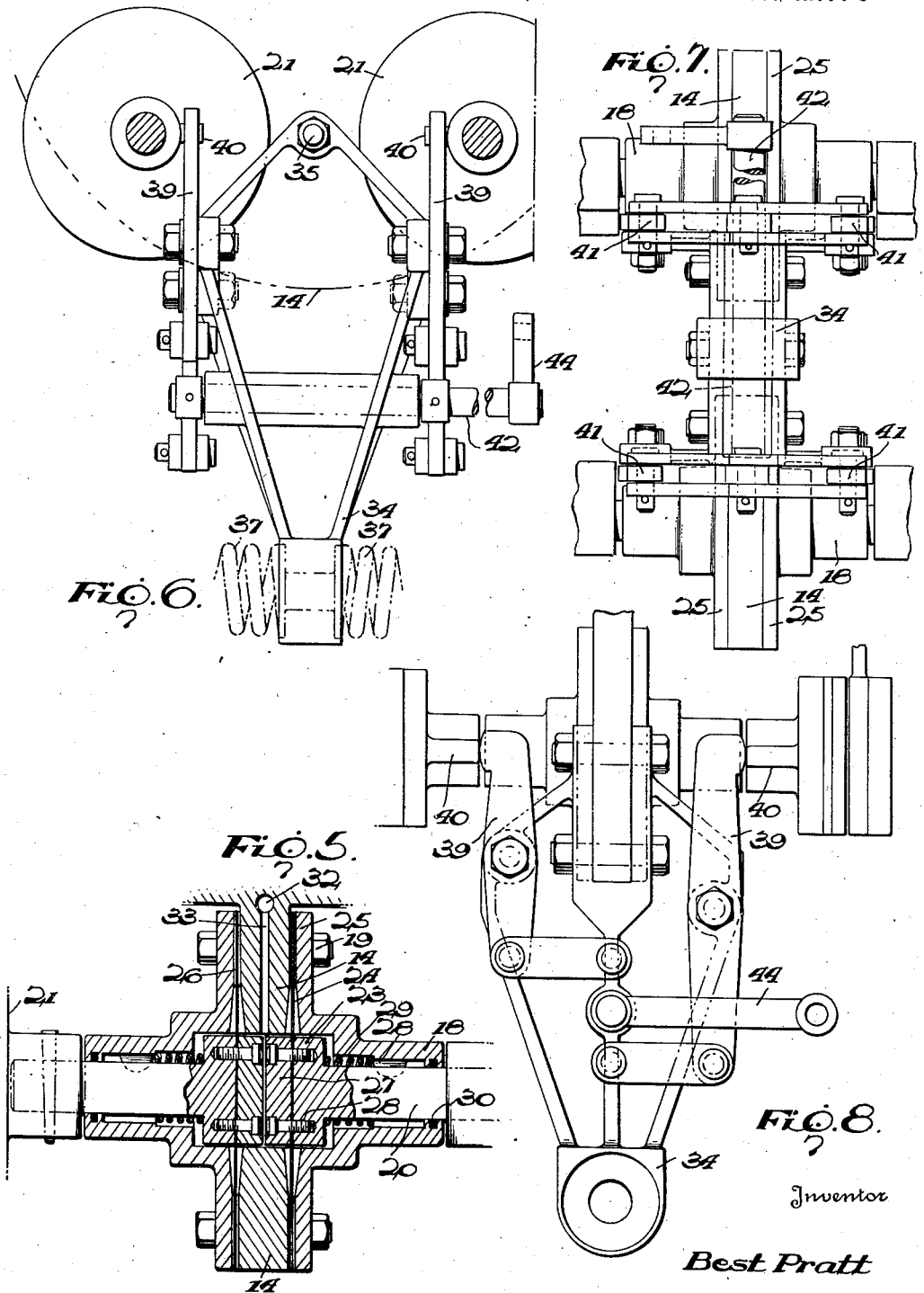
Inventor
Best Pratt Patented Apr. 20, 1948

2,440,020

UNITED STATES PATENT OFFICE 2,440,020

DISK BRAKE

Best Pratt, Chicago, Ill., assignor to Brake Equipment & Supply Company, Chicago, Ill., a corporation of Illinois Application June 26, 1945, Serial No. 601,609

15 Claims. (Cl. 188—153)

1

This invention has to do with brakes for vehicles, particularly railway cars and trucks, both of which types of vehicles require efficient and powerful braking equipment. The brake is of the disk type, as distinguished from the shoe and wheel tread type, to which last-named and usual type there are certain objections, among which may be mentioned overheating with danger of wheel tread or shoe damage by spotting or shelling; wheel locking and sliding, resulting in tread flats; necessity for train stoppage for cooling, etc. These difficulties are overcome in the disk type of brake.

The present construction is designed for easy installation and operation with present type vehicles with a minimum of change in make-up of such vehicles. Further, it is so developed that it can be readily coupled to and operated from the hand brake equipment, so that in event of failure in any system depending on remote control, as, for example, an air pressure or an electrically controlled system, the brakes may be applied by manual operation of the hand brake mechanism. Another advantageous and important result attained by the invention is the saving in air volume necessary to effective operation of the brakes. This is brought about by so constructing and assembling the brake parts that only a limited movement of the parts from "off" position to "on," or braking position, is necessary, thereby eliminating lost motion in the moving parts and reducing the volume of air necessary to brake operation.

Briefly stated, the invention contemplates the provision of brake disks mounted on and revolving with the axles of the vehicle, between which disks are disposed a plurality of friction elements, such friction elements being arranged symmetrically about the axis of revolution of the disks so as to impose a properly balanced thrust and frictional engagement with the disks, to the end that even braking action will be secured. Between these friction elements are actuating means, here shown as air-pressure means, under remote control, which actuating means will exert opposite and equal thrusts on the friction elements to engage them with the disks on the axles and effect braking action. Where air pressure is used, control of that pressure will be by the usual or any suitable instrumentalities, such as are used in wheel and shoe braking. Such friction elements are also so mounted and related to the hand-brake mechanism that they can be hand operated to apply the brakes if the need arises.

2

In the drawings herewith as a part of this disclosure, one form of the invention is shown. In the drawings:

Figure 1 is a view in plan of a general layout of the brake mechanism, this view showing also the tie-in with the hand brake elements.

Figure 2 is a view in side elevation of the mechanism shown in Figure 1.

Figure 3 is a detail view in elevation, on a larger scale, of a brake disk, its cooperating friction elements, and the hand brake connections.

Figure 4 is a view, partly in section, of the mechanism shown in Figure 3, showing the axle, disks, friction elements, and pressure connections for actuating the parts.

Figure 5 is a detail sectional view of the pressure controlled diaphragms, their supporting frame, and the brake operating heads actuated by the diaphragms.

Figure 6 is a detail in side elevation of the hand brake connection.

Figure 7 is a view in end elevation, looking from the right, Figure 6.

Figure 8 is a detail of the hand brake operating mechanism.

Referring to the drawings by numbers, like parts being designated by like numbers in the several views, 10 indicates a vehicle axle having wheels 11, the axle and wheels here shown being designed for a railway vehicle.

Mounted on the axles 10 are braking disks 12 fixedly secured thereto in any suitable manner, being here shown as made in half sections, clamped to the axle by suitable nuts and bolts 13. Disks 12 are opposed to each other, as shown, and may be disposed any suitable distance apart and symmetrically mounted between the wheels 11 of the vehicles. These disks 12 may be provided with heat dissipating ribs, as shown in Figs. 2 and 3.

Mounted between the disks 12 in such fashion that the shaft 10 is freely revoluble relative to it is a frame or carrier which, as here shown, is made up of a centrally disposed, disk-like, circumferential portion 14 which has laterally extending bearing flanges 15 with ball races and ball bearings 16. These bearings, combined with the ball races mounted on the shaft 10, as shown in Figure 4, provide a freely rotatable assembly of the carrier 14 and the shaft 10. The bearing flanges 15 will preferably be provided with gaskets 17 to exclude dust from the bearings. While the shaft 10 and carrier 14 are freely rotatable relative to each other, movement of the carrier 14 is restrained by means of the tension lever hereinafter described.

The disk-like circumferential portion of the carrier frame 14 has secured to it friction elements which are circumferentially spaced as shown in Figure 3. These elements are made up of the sleeve members 18 provided with flanges by which they are secured to the circumferential, disk-like frame 14, as, for example, by nut end bolt connections 19. Mounted in the sleeve members 18 are thrust rods or stems 20 which carry at their outer ends brake blocks 21 adjacent the inner faces of the braking disk 12, these brake blocks, as here shown, being preferably circular and having a suitable friction medium 22 on their outer faces to engage the inner surfaces of the brake disks 12. The rods 20 at their inner ends are provided with brake block actuating heads 23 to which heads are clamped diaphragms 24, which diaphragms in turn are clamped between the carrier 14 and the flanges 25 on the sleeve member 18, which together form chambers to receive the diaphragms, gaskets 26 being preferably provided to prevent leakage of pressure from behind the diaphragms. The diaphragms and piston heads 23 may be secured in any suitable manner, but as here shown the disk 27 is provided, and by means of bolts 28 the diaphragm is securely held to the head. The brake block stem 20 will be keyed to the sleeve 18, as shown in Figure 5, in order to prevent rotation, and to maintain the head, diaphragm, stem, and brake block normally in retracted position there is a spring 29 normally urging the parts to the position shown in Figure 5. The sleeve 18 will be provided with washers or gaskets 30 to prevent foreign matter from getting into the stem and diaphragm chambers.

The diaphragms and their associated parts are pressure operated by pressure coming from any suitable source through supply pipes 31, best shown in Figure 3, these supply pipes, which also serve as exhaust pipes as in the usual operation of fluid pressure brake systems, delivering pressure to a circumferential passage 32, from which, in turn, pressure passes by branch passages 33 to the diaphragm chambers, the passages 33 delivering to the two opposed diaphragm chambers, as shown in Figure 5, so as to act simultaneously and equally upon the diaphragms and exert the same pressure on the brake blocks 21. As shown in Figure 5, the diaphragm chambers are somewhat enlarged adjacent the diaphragm and heads by forming chambers in the opposed faces of the disk-like portion of the frame 14 and the flanges 25 of the members 18. The chambered area is relatively small, as diaphragm movement is limited but, owing to the compact assemblage, such movement is ample for actuating the braking instrumentalities.

Air pressure will be applied to and exhausted from the pipes 31 in the usual manner, fluid pressure being under the control of any suitable mechanisms, as, for example, an engineer brake valve and its associated parts.

It has been pointed out that the carrier 14 and the axle are mounted in freely rotatable relation, but to restrain the carrier from free rotating movement relative to the axle 10 and its associated parts, there is provided an arm 34 bolted at 35 to the carrier 14 and having its end 36 resiliently restrained by the bolt and spring connection 37, as best shown in Figs. 2 and 6, this bolt and spring connection being supported by any suitable part of the vehicle frame, as for example, a bolster member 38, as shown in Fig. 2.

The number of brake blocks 21 may, of course, be varied, four being here shown, and their size may be adapted to the particular conditions under which they are to be used.

As here shown, four brake blocks 21 are provided, these members being disposed symmetrically relative to the brake disks 12, so as to distribute braking stresses evenly about the disk.

It will be seen that with the frame 14 having the centrally disposed, disk-like projection with the pressure passage 33 delivering to both the diaphragm chambers and acting on the opposed faces of said diaphragms, that the very close disposition of the flanges 25 of the members 18 holding both diaphragms in place and the tie-in of the heads 23 with the diaphragms in the brake block results in an unusually close assemblage of parts and one in which braking is effected with a minimum movement of the brake blocks and by the use of a minimum volume of air. This relatively slight movement of the parts nevertheless results in high braking pressures.

The mounting of the parts is so compact that brake block clearance relative to the disks need be only 1/8" with a corresponding limited movement of the head for actuating the brake blocks. With four cylinders per axle with a double 8" diameter diaphragm at 50 lbs. pressure per square inch, a braking pressure of 20,000 lbs. for each axle is secured. With four wheel trucks for each car 80,000 lbs. of braking pressure will be produced. Such pressure would be suitable for a car of 100,000 lbs. weight.

The advantage and value of this close and compact assembly with the resulting conservation of air volume will be appreciated when it is pointed out that in some disk brakes using pistons, with two 10" brake cylinders on each truck it is necessary to provide for not less than 8" piston travel for each piston in order to secure the necessary brake block clearance. This excessive travel calls for an air volume of 2,500 cubic inches before the brake blocks become effective.

With the construction herein set forth in which clearance requires only 1/8" travel of brake blocks and block actuating heads and diaphragms, sixteen (16) heads and diaphragms for each car will require only 100 cubic inches of air volume for each car. This effects a saving of 2,400 cubic inches of air over known wasteful assemblies now in use.

In order that the braking mechanism heretofore described as fluid pressure operated, may be operated from the hand brake equipment, I provide the following rigging, so that in event of failure of fluid pressure the braking mechanism may be operated from the hand brake wheel.

Referring particularly to Figs. 1, 2, 6, 7, and 8 of the drawings, the general layout of the rigging is disclosed in Figs. 1 and 2, and the details of the construction by which the brakes may be applied from the hand brake are disclosed in the other figures. Brake actuating levers 39 are provided, four in number, and pivotally mounted upon the upper and lower webs of the tension lever 34, as shown in Figs. 2 and 6. These levers 39 engage lugs 40 on the brake blocks 21, as clearly shown in Fig. 4, so that upon operation of the levers 39 the brake blocks 21 will be actuated. The levers 39 are actuated through a bell crank 41 mounted on a rock shaft 42 and coupled by links 43 with the levers 39. The bell crank shaft 42 has the actuating lever 44 which, as shown in Fig. 2, is actuated by the rod 48 coupled to the lever 46, connected by the link 47 with the lever 44. The lever 46 is connected with the brake rigging rod 48, and is pivotally mounted on any suitable support 49, so that when it is thrown by the operation of the hand brake rigging rod, it will, through the link 47, lever 44, and rock shaft 46, actuate the levers 39 and the brake blocks. The actuating lever 46, which is operated by the brake rigging rod 48 will be connected by the rod 50 with the lever 44 of the brake mechanism for the other set of wheels, so that application of brakes will be applied equally to both sets of brakes when the hand brake rigging is operated. It will be seen that when the hand brake rigging is actuated from the hand wheel the brake blocks will be applied equally in opposite directions to the brake disks. As here shown, the two inner brake disks 21 of each set are actuated through this hand brake rigging, just described, this being a convenient and efficient arrangement, giving balanced braking, without unduly complicating the rigging for hand brake wheel application.

It will be understood that the specific embodiment of the invention here shown is illustrative, but not restrictive, of the invention. Equivalent constructions involving only the exercise of mechanical skill may be readily adopted and such changes are to be regarded as within the range of the invention as defined in the appended claims.

I claim:

1. Braking mechanism for vehicles comprising a vehicle axle, brake disks mounted for rotation with said axle, a chambered supporting frame for brake elements mounted on said axle in operative relation to said disks and in rotatable relation to said axle, opposed diaphragms mounted in the chambers of said frame, means for applying fluid pressure to and exhausting it from the opposed faces of said diaphragms, and a plurality of brake blocks carried by such chambered frame and actuated by said diaphragms to engage said disks.

2. Braking mechanism for vehicles comprising a vehicle axle, brake disks mounted for rotation with said axle, a chambered supporting frame for brake elements mounted on said axle in operative relation to said disks and in rotatable relation to said axle, means to restrain rotation of said frame on said axle, opposed diaphragms mounted in the chambers of said frame, means for applying fluid pressure to and exhausting it from the opposed faces of said diaphragms, a plurality of brake blocks carried by said chambered frame and actuated by said diaphragms to engage said disks, and means for disengaging said brake blocks from said disks upon cessation of fluid pressure.

3. Braking mechanism for vehicles comprising a vehicle axle, brake disks mounted for rotation with said axle, a chambered supporting frame for brake elements mounted on said axle in operative relation to said disks and in rotatable relation to said axle, means to restrain rotation of said frame on said axle, opposed diaphragms mounted in the chambers of said frame, means for applying fluid pressure to and exhausting it from the opposed faces of said diaphragms, a plurality of brake blocks carried by said chambered frame and actuated by said diaphragms to engage said disks, and means automatically to disengage said brake block from said disks upon cessation of fluid pressure.

4. Braking mechanism for vehicles comprising a vehicle axle, brake disks mounted for rotation with said axle, a chambered supporting frame for brake elements mounted on said axle in operative relation to said disks and in rotatable relation to said axle, means to restrain rotation of said frame on said axle, opposed diaphragms mounted in the chambers of said frame, means for applying fluid pressure to and exhausting it from the opposed faces of said diaphragms, a plurality of brake blocks carried by said chambered frame and actuated by said diaphragms to engage said disks, and spring means automatically to disengage said brake blocks from said disks upon cessation of fluid pressure.

5. Braking mechanism for vehicles comprising a vehicle axle, brake disks mounted for rotation with said axle, a chambered supporting frame for brake elements mounted on said axle disposed between said disks and in rotatable relation to the axle, means to restrain rotation of said frame on said axle, opposed diaphragms mounted in the chambers of said frame, means for applying fluid pressure to and exhausting it from the opposed faces of said diaphragms, a plurality of brake blocks carried by said chambered frame in balanced relation relative to said disks and actuated by said diaphragms, and means independent of said diaphragms to disengage said brake blocks from said disks upon cessation of fluid pressure.

6. Braking mechanism for vehicles comprising a vehicle axle, brake disks mounted for rotation with said axle, a chambered supporting frame for brake elements mounted on the axle in operative relation to said disks and in rotatable relation to the axle, a restraining arm or tension lever extending from said frame to restrain rotation of said frame on the axle, opposed diaphragms mounted in the chambers of said frame, means for applying fluid pressure to and exhausting it from the opposed faces of said diaphragms, a plurality of brake blocks carried by said chambered frame and laterally movable by said diaphragms to engage the said opposed brake disks, and means automatically to disengage said brake blocks from said disks upon cessation of fluid pressure on said diaphragms.

7. Brake mechanism for vehicle brakes of the disk brake type, comprising brake disks mountable on and rotatable with a vehicle axle, a brake block support comprising a central frame member mountable on said axle and having a main fluid passage therein, means for supplying fluid pressure to the main pressure passage, side frame members forming with said central member a plurality of closed diaphragm chambers each connected by an auxiliary pressure passage with the main pressure passage in said central frame member, opposed diaphragms in each of the diaphragm chambers, and brake blocks carried by said side members and operable in opposite directions by said diaphragms to engage said brake disks.

8. Brake mechanism for vehicle brakes of the disk brake type comprising brake disks mountable on and rotatable with a vehicle axle, a central frame mountable on a vehicle axle in fixed relation thereto and having fluid pressure passages therein, means for supplying pressure to the pressure passages, side frames secured to said central frame and forming therewith closed diaphragm chambers connected with the fluid pressure passage in said central frame, diaphragms in said chambers, brake blocks disposed in operative relation to said disks, and means operable by said diaphragms to move said blocks into braking contact with said disks.

9. Brake mechanism for vehicle brakes of the disk brake type comprising brake disks mountable on and rotatable with a vehicle axle, a central frame mountable on a vehicle axle in fixed relation thereto and having fluid pressure passages therein, means for supplying pressure to the pressure passages, a plurality of side frames secured to said central frame circumferentially and on opposite sides thereof and forming therewith closed diaphragm chambers connected with the fluid pressure passage in said central frame, diaphragms in said chambers, brake blocks disposed in operative relation to said disks, and means operable by said diaphragms to move said blocks into braking contact with said disks.

10. Brake mechanism for vehicle brakes of the disk brake type comprising brake disks mountable on and rotatable with a vehicle axle, a central frame mountable on a vehicle axle in fixed relation thereto and having fluid pressure passages therein, means for supplying pressure to the pressure passages, a plurality of side frames secured to said central frame circumferentially and on opposite sides thereof and forming therewith closed diaphragm chambers connected with the fluid pressure passage in said central frame, diaphragms in said chambers, brake blocks freely movable in opposite directions disposed in operative relation to said disks, and means operable by said diaphragms to move said blocks into braking contact with said disks.

11. Brake mechanism for vehicle brakes of the disk brake type comprising opposed brake disks mountable on and rotatable with a vehicle axle, a central frame mountable on a vehicle axle between said opposed disks in fixed relation thereto and having fluid pressure passages therein, means for supplying pressure to the pressure passages, a plurality of side frames secured to said central frame circumferentially and on opposite sides thereof and forming therewith closed diaphragm chambers connected with the fluid pressure passage in said central frame, diaphragms in said chambers, brake blocks freely movable in opposite directions disposed in operative relation to said disks, and means operable by said diaphragms to move said blocks into braking contact with said disks.

12. Braking instrumentalities for vehicles comprising a rotatable vehicle axle, opposed brake disks fixedly mounted on said axle for rotation therewith; a supporting frame having a disk-like, circumferential portion extending therefrom and provided with a diaphragm chamber and a pressure supply passage; sleeve members disposed on either side of said disk-like portion, diaphragms clamped between said disk-like portion and said sleeve member, said circumferential portion and sleeve members being recessed on their opposed faces to provide diaphragm chambers; brake block operating heads coupled to said diaphragms, and brake blocks in braking relation to said disks connected with said pistons.

13. Braking instrumentalities for vehicles comprising a rotatable vehicle axle; opposed brake disks fixedly mounted on said axle for rotation therewith; a supporting frame having a disk-like, circumferential portion extending therefrom and provided with an opening therethrough, said portion having recesses on its outer faces surrounding the opening to form a diaphragm chamber, and provided with a pressure supply passage leading to the chamber; diaphragm clamping members having diaphragm clamping flanges recessed on their inner faces to form diaphragm chambers; diaphragms clamped between said recessed members and said recessed disk-like portion; brake block operating heads coupled to said diaphragms, and brake blocks in braking relation to said disks connected to said pistons.

14. Brake block operating means comprising a frame having a disk-like, circumferential portion having an opening and a pressure supply passage leading thereto, the opposite faces of said disk-like portion being recessed adjacent the opening; members having clamping flanges with recessed inner faces to form, with said recessed disk-like flange, diaphragm chambers; diaphragms clamped between said recessed flanges; opposed brake block operating heads coupled to said diaphragms, and operating connections between said heads and said brake blocks.

15. Brake block operating means comprising a frame having a disk-like, circumferential portion having an opening therethrough, and a pressure supply passage leading thereto, the opposite faces of said disk-like portion being recessed adjacent the opening; piston receiving members having clamping flanges with recessed inner faces to form, with said recessed disk-like flange, diaphragm chambers; opposed brake block operating heads connected to said diaphragms, and operating connections between said heads and said brake blocks.

BEST PRATT.

REFERENCES CITED

The following references are of record in the file of this patent:

UNITED STATES PATENTS

| Number | Name | Date |
|---|---|---|
| 143,980 | Henderson | Oct. 28, 1873 |
| 1,317,503 | Josephson | Sept. 30, 1919 |
| 1,575,191 | Coatalen | Mar. 2, 1926 |
| 2,174,400 | McCune | Sept. 26, 1939 |
| 2,228,818 | Eksergian | Jan. 14, 1941 |
| 2,263,945 | Eksergian | Nov. 25, 1941 |
| 2,281,537 | Spieth | Apr. 28, 1942 |
| 2,295,797 | McCune et al. | Sept. 15, 1942 |
| 2,308,890 | McCune | Jan. 19, 1943 |
| 2,334,168 | Aurien | Nov. 16, 1943 |
| 2,347,387 | Aurien | Apr. 25, 1944 |